United States Patent [19]

Karayannis et al.

[11] 3,926,928

[45] Dec. 16, 1975

[54] CATALYST AND PROCESS FOR THE POLYMERIZATION OF ALPHA-OLEFINS

[75] Inventors: Nicholas M. Karayannis, Hinsdale; Missak Khelghatian, Naperville; Sam S. Lee, Hoffman Estates, all of Ill.

[73] Assignee: Standard Oil Company, Chicago, Ill.

[22] Filed: Aug. 27, 1973

[21] Appl. No.: 391,608

[52] U.S. Cl........ 260/88.2; 252/429 B; 260/88.2 R; 260/93.7; 260/94.9 CB; 260/94.9 CC; 260/94.9 CD
[51] Int. Cl.$^2$.................. B01J 31/02; C08F 210/00; C08F 212/00; C08F 110/02
[58] Field of Search...................... 260/93.7, 88.2 R

[56] References Cited
UNITED STATES PATENTS

| | | | |
|---|---|---|---|
| 2,956,991 | 10/1960 | Coover et al. | 260/93.7 |
| 3,449,263 | 6/1969 | Watt | 252/429 |
| 3,502,634 | 3/1970 | Stedefeder | 260/93.7 |
| 3,736,307 | 5/1973 | Perry | 260/88.2 R |

OTHER PUBLICATIONS

Doak and Schrage, in "Crystalline Olefin Polymers — Part I" (Interscience, 1965) — pp. 366–371.
Coover and Joyner, J. Polymer Science, Part A, 1965, 3, 2407–2424.

*Primary Examiner*—Joseph L. Schofer
*Assistant Examiner*—A. L. Clingman
*Attorney, Agent, or Firm*—Reed F. Riley; William T. McClain

[57] ABSTRACT

A novel catalyst and process for producing crystalline polypropylene and its copolymers with other alpha-olefins which can substantially reduce the amount of low-molecular-weight and amorphous polymers formed without reduction in the polymerization rate. This novel catalyst and process are useful in slurry polymerization, bulk polymerization and polymerization techniques in which polymerization is accomplished utilizing monomer substantially in the vapor phase.

14 Claims, No Drawings

CATALYST AND PROCESS FOR THE POLYMERIZATION OF ALPHA-OLEFINS

SUMMARY OF THE INVENTION

This invention relates to a novel catalyst and process for the polymerization of propylene and its mixtures with other alpha-olefins to produce normally-solid, crystalline polymers, and more specifically, to a novel catalyst and process for polymerization of propylene and its mixtures with other alpha-olefins which produces normally-solid, crystalline polymeric products wherein coproduced low-molecular-weight and amorphous polymers are substantially reduced while maintaining the polymerization rate.

In accordance with the instant invention, propylene and its mixtures with other alpha-olefins are polymerized to normally-solid, crystalline polymers using a slurry, bulk or vapor technique at monomer pressures of about atmospheric pressure and above and moderate polymerization temperatures with a catalyst system comprising: (a) an alkyl aluminum compound, (b) a chloride of titanium, and (c) a hydrocarbyltin sulfide and trihydrocarbylphosphite. The polymeric products produced using the above described catalyst can contain amounts of low-molecular-weight and amorphous components, as measured by extraction using n-hexane, as low as about one percent of the total polymer yield.

BACKGROUND OF THE INVENTION

Polymers of alpha-olefins prepared in the presence of ionic catalyst systems, as for example polypropylene prepared using a catalyst comprised of diethylaluminum chloride and titanium trichloride, contain greater or lesser amounts of low-molecular-weight and amorphous components which, when taken alone, are viscous oils or soft, tacky solids. The presence of these alkane-soluble materials in the polymers leads to difficulties during the fabrication of products therefrom and to inferior physical properties in the finished items, and hence are almost always removed in commercial processes for the production of polypropylene. Production of these components leads to an economic disability for the polymerization process as they have little usefulness and extra process steps are required to remove them from the commercial product.

In the past a number of materials and combinations thereof have been reported in the patent literature as useful (c) components to reduce the alkane-soluble fraction produced during the polymerization process. Among these materials have been amines, amine oxides, ethers and organic phosphites. Some organotin oxides and sulfides have been described as well with oxides showing a far greater effect on Solubles reduction than the corresponding sulfides. Generally, such materials give ionic catalyst systems which, when used to polymerize an alpha-olefin such as propylene, result in a reduction of the polymerization rate as well as the Solubles so that an increase in the proportion of crystalline polypropylene formed is obtained but at the expense of the total polymerization yield.

Now it has been found that by using an ionic catalyst with a (c) component composed of a trihydrocarbylphosphite and a hydrocarbyltin sulfide, a substantial reduction of Solubles can be accomplished while maintaining or improving the total yield of polymer. In addition, the instant catalyst can give an improvement in a solventless polymerization process wherein the olefin is polymerized directly from the vapor or liquid phase. The instant (c) component may also be used for olefin polymerizations wherein a supported organometallic-transition metal catalyst is employed.

STATEMENT OF THE INVENTION

As shown in Table I, the n-hexane-soluble fraction can be substantially reduced in a slurry-type process when an ionic catalyst combining a hydrocarbyltin sulfide and a trihydrocarbylphosphite is used. Table I shows further that the Crystalline Rate can be maintained in the presence of the (c) component of the present invention while reducing substantially the Solubles. Additionally, the Table shows the improvement in Rate and Solubles resulting from the combination of materials as compared with either material used alone.

Table I

Slurry Polymerization of Propylene

Comparison of Crystalline Rates and
Solubles for Different Amounts of the (c) Component

| BTS/TBP* (molar ratios) | Crystalline Rate (grams per gram TiCl$_3$) per hour | Solubles** (percent) |
|---|---|---|
| 0/0 | 965 | 8.8 |
| 0.04/0 | 807 | 4.4 |
| 0/0.34 | 700 | 5.0 |
| 0.04/0.34*** | 950 | 2.9 |

*BTS represents bis-(tributyltin) sulfide. TBP represents tributyphosphite and Et$_2$AlCl represents diethylaluminum chloride.

**Solubles was determined by filtering the solid product away from the polymerization medium, chopping in a blender with 2 liters of n-hexane and then with 2 liters of methanol and finally washing the resulting solid polymer with 500 milliliters of n-hexane. The hexane portions were then combined and a 10 percent aliquot evaporated to dryness and the residue dried under vacuum at about 80°C. Solubles is then 100 times the total soluble polymer divided by the total polymer produced.

***This polymerization used a different batch of the same aluminum reduced and activated TiCl$_3$ for which a control run (0/0) gave a Crystalline Rate of 930 and Solubles of 11.1.

Table II

Bulk Polymerization of Propylene
Comparison of Crystalline Rates and
Solubles for Different Amounts of the (c) Component

| BTS/TBP (molar ratios) | Crystalline Rate (grams per gram TiCl$_3$ per hour) | Solubles* (percent) |
|---|---|---|
| 0/0 | 1,841 | 4.78 |
| 0/0.337 | 1,340 | 2.91 |
| 0/0.675 | 1,520 | 1.16 |
| 0/1.01 | 1,350 | 1.7 |
| 0.3/0 | 1,542 | 2.53 |
| 0.12/0.225 | 1,957 | 1.80 |
| 0.242/0.225** | 1,677 | 4.58 |
| 0.363/0.228** | 1,708 | 4.36 |

*Solubles was determined by taking a 20 gram portion of the polypropylene product and washing it at room temperature with 200 milliliters of hexane containing 2 milliliters of methanol. The remaining polypropylene product was dried at 75°C. for 3 hours. The filtrate was evaporated to dryness. Solubles is then 100 times the residue from evaporation divided by 20.

**bis-(tributyl)tin oxide was used in place of BTS in these two polymerizations.

Table III

Bulk Polymerization of Propylene
Comparison of Crystalline Rate and Solubles*
for Different Amounts of the (c) Component

| BTS/TBP (molar ratios) | Crystalline Rate (grams per gram TiCl$_3$ per hour) | Solubles (percent) |
|---|---|---|
| 0/0 | 891 | 5.3 |
| 0.04/0 | 1,005 | 4.3 |
| 0/0.57 | 1,065 | 3.6 |
| 0.04/0.34 | 1,265 | 2.1 |

Table III-continued

Bulk Polymerization of Propylene Comparison of Crystalline Rate and Solubles* for Different Amounts of the (c) Component

| BTS/TBP (molar ratios) | Crystalline Rate (grams per gram TiCl₃ per hour) | Solubles (percent) |
|---|---|---|
| 0.04/0.51 | 1,181 | 1.6 |

*Solubles was determined by taking a 20 gram portion of polymer product, treating it with 250 milliliters of n-hexane at 160°F. for two hours, washing the residue with 100 milliliters of n-hexane, combining the wash and extract liquids and removing the hexane at ambient temperature in a vacuum oven. The extracted product was then dried at 160°F. for two hours. Solubles is 100 times the residue remaining after evaporation of the wash and extract liquids divided by 20.

Tables II and III show similar results for polymerization of propylene using a bulk technique.

The (a) components useful for the herein described invention are alkylaluminum derivatives wherein the alkyl radical contains one to about six carbon atoms and, more specifically, are trialkyl aluminum compounds, mixtures thereof with an alkylaluminum dichloride or dibromide or a dialkyl-aluminum chloride or bromide, or dialkylaluminum chlorides or bromides. More preferably, the (a) component is trialkyl aluminum, mixtures thereof with either a dialkylaluminum chloride or an alkylaluminum dichloride, or a dialkylaluminum chloride. Most preferably, a dialkylaluminum chloride is used. The amount of (a) component to be used is based upon the reactor size, the amount of (b) component used and the amount of olefin to be polymerized as is well known to one skilled in the art.

The (b) components useful herein are compounds of titanium, and, more preferably, the (b) component is titanium halide. Most preferably, the (b) component is titanium trichloride. The amount of the (b) component used is based upon the amount and composition of the particular polymer to be made and is well known to one skilled in the art.

The phosphite part of the (c) component is usefully any trihydrocarbylphosphite and, more preferably, a trialkylphosphite where the alkyl group has one to about six carbon atoms or a triarylphosphite. Most preferably the phosphite part is a trialkylphosphite.

The sulfide part of the (c) component is usefully a sulfide of an alkyl, alkaryl or aryl tin radical. More preferably, this part is a sulfide of a trialkyl- or triphenyltin radical or a dialkyl- or diphenyltin radical. Most preferably, the sulfide part of the (c) component is a bis-(trialkyl)tin sulfide. By lower alkyl is here meant an alkyl group containing one to about six carbon atoms.

Usefully, the mole percentage of the phosphite and sulfide parts of the (c) component run from about 99 mole percent of the former and about 1 mole percent of the latter to about 1 mole percent of the former and about 99 mole percent of the latter. More preferably, the concentration range of the parts of the (c) component runs from about 85 to about 20 mole percent of the phosphite part and from about 15 to about 80 mole percent of the sulfide part. Most preferably, the concentration range of the parts runs from about 85 to 40 mole percent of the phosphite part and from about 15 to about 60 mole percent of the sulfide part.

The amount of the (c) component depends upon the amount of (a) component to be used. Too little of the (c) component will not show an appreciable reduction of the low-molecular-weight and amorphous polymer produced. Too much of the (c) component will either reduce the polymerization rate or kill it completely depending upon the relative concentrations of each of the parts. In general, the (c) component amount can vary from about 0.1 mole percent of the (a) component to about 50 mole percent of the (a) component. More preferably, the range is about 0.5 mole percent of the (a) component to about 40 mole percent of (a) component and, most preferably, it may vary from about 0.5 mole percent of the (a) component to about 30 mole percent of the (a) component.

The parts of the (c) component may be added separately to the (a) and (b) components or, alteratively, they may be added together.

As is obvious to one skilled in the art, precautions should be taken to avoid oxygen and moisture contamination of the catalyst during its preparation and its transfer. Catalyst preparation can be carried out under an inert atmosphere using such gases as argon, nitrogen, helium, etc. Normally, during use no precautions need be taken as a positive pressure of monomer gas exists within the reactor.

The temperature at which the catalyst may be used is not critical and depends, in general, upon the particular (a) and (b) components which are used. However, at temperatures below about 0°C. the rate of polymerization slows down and reactor residence times become unreasonably long whereas, at temperatures above about 120°C., polymerization rates become too high and an increase in Solubles production is found. Preferably, the temperature range in which the catalyst can be used is about 2°C. to about 95°C. Most preferably, the temperature range is about 50°C. to about 80°C.

The process of the invention can be carried out at a monomer pressure of about atmospheric or above. Pressures of about 50 p.s.i.g. to about 600 p.s.i.g. or higher are preferred depending upon which polymerization technique is used.

The organic liquid employed as the polymerization medium in the slurry technique can be an aliphatic alkane or cycloalkane such as pentane, hexane, heptane or cyclohexane, or a hydrogenated aromatic compound such as tetrahydronaphthalene or decahydronaphthalene, or a high molecular weight liquid paraffin or mixture of paraffins which are liquid at the reaction temperature, or an aromatic hydrocarbon such as benzene, toluene or xylene, or a halogenated aromatic compound such as chlorobenzene, chloronaphthalene or ortho-dichlorobenzene. The nature of the reaction medium is subject to considerable variation, although the material employed should be liquid under the conditions of reaction and relatively inert. The hydrocarbon liquids are desirably employed. Other solvents which can be used include ethylbenzene, isopropylbenzene, ethyltoluene, n-propylbenzene, diethylbenzenes, mono- and dialkyl-naphthalenes, n-pentane, n-octane, isooctane and methylcyclohexane. The preparative media employed in practicing this invention can be advantageously purified prior to use in the polymerization reaction by contacting the material, for example, in a distillation procedure or otherwise, with aluminum alkyl compound to remove undesirable trace impurities. Also, prior to polymerization the catalyst can be contacted advantageously with polymerizable alpha-olefin.

The polymerization time is not critical and will usually be of the order of from 30 minutes to several hours in batch processes. Contact times of from one to four hours are commonly employed in autoclave-type reactions. When a continuous slurry process is employed, the contact time in the polymerization zone can also be regulated as desired, and in some cases it is not necessary to employ reaction or contact times much beyond one-half to one hour since a cyclic system can be employed by separation of the polymer and return of the solvent and excess monomer to the charging zone wherein the catalyst can be replenished and additional monomer introduced.

The invention is of particular importance in the preparation of highly-crystalline polypropylene, although it can be used for polymerizing propylene and its mixtures with other alpha-olefins of up to about eight carbon atoms. It is useful for preparing pure-block, terminal-block or multi-segment types of copolymers of ethylene and propylene or propylene and other alpha-olefin monomer wherein the majority of the polypropylene is still substantially crystalline. Such copolymers can contain up to about twenty weight percent of another alpha-olefin depending upon the copolymer type. The pure-block copolymer may be composed of two different blocks or may be of the types ABAB etc. or ABCABC etc.

The process and catalyst of this invention are normally used with an additive to control molecular weight such as dialkyl zinc compounds or hydrogen, preferably hydrogen. Solid polymers having molecular weights greater than about 50,000 and less than about 5,000,000 result thereby. The amount of hydrogen to be used depends upon the melt index and molecular weight distribution to be obtained and is well known to those skilled in the art.

While the invention is described in connection with the specific Examples below, it is to be understood that these are for illustrative purposes only. Many alternatives, modifications and variations will be apparent to those skilled in the art in the light of the below Examples and such alternatives, modifications and variations fall within the scope and spirit of the appended claims.

EXAMPLE I

All polymerizations in this Example were carried out in a 1 gallon reactor using 1,500 milliliters of hexane as a preparation medium in two hour runs at 160°F and 250 p.s.i.g. propylene pressure. A 3 p.s.i.g. hydrogen pressure was employed. Aluminum reduced and activated $TiCl_3$ was used with $Et_2AlCl$.

Solubles was determined by filtering the solid product away from the polymerization medium, chopping in a blender with 2 liters of n-hexane and then with 2 liters of methanol and finally washing the resulting solid polymer with 500 milliliters of n-hexane. The hexane portions were then combined and a 10 percent aliquot evaporated to dryness and the residue dried under vacuum at about 80°C. Solubles is then 100 times the total soluble polymer divided by the total polymer produced.

The results are shown in the Table below.

TABLE IV

| $Et_2AlCl/TiCl_3/BTS/TBP$ (Molar Ratios) | Crystalline Rate (grams per gram $TiCl_3$ per hour) | Solubles (percent) |
|---|---|---|
| 5.5 / 1 /0.12/0.225 | 644 | 3.5 |
| 2.75 / 1 /0.03/0.057 | 664 | 6.4 |
| 2.75 / 1 /0.06/0.113 | 681 | 3.9 |
| 2.75 / 1 /0.09/0.113 | 628 | 5.1 |
| 2.75 / 1 /0.06/0.17 | 570 | 3.5 |
| 3.41 / 1 /0.06/0.17 | 655 | 4.5 |
| 3.0 / 1 /0.04/0.075 | 865 | 4.7 |

TABLE IV-continued

| $Et_2AlCl/TiCl_3/BTS/TBP$ (Molar Ratios) | Crystalline Rate (grams per gram $TiCl_3$ per hour) | Solubles (percent) |
|---|---|---|
| 4.5 / 1 /0.04/0.075 | 897 | 4.9 |
| 3.0 / 1 /0.06/0.113 | 783 | 4.1 |

The results below were obtained using another variety of aluminum reduced and activated $TiCl_3$.

| $Et_2AlCl/TiCl_3/BTS/TBP$ (Molar Ratios) | Crystalline Rate (grams per gram $TiCl_3$ per hour) | Solubles (percent) |
|---|---|---|
| 4.0 / 1 /0.04/0.075 | 940 | 4.5 |
| 4.0 / 1 /0.04/0.113 | 1000 | 4.1 |
| 4.0 / 1 /0.04/0.17 | 1040 | 3.6 |
| 4.0 / 1 /0.04/0.225 | 888 | 3.1 |
| 1.5 / 1 /0.02/0.085 | 719 | 5.3 |
| 3.0 / 1 /0.03/0.225 | 956 | 3.7 |

EXAMPLE II

All polymerizations were carried out in a 1 liter reactor using 13.3 milliliters of hexane in 2 hour runs at 160°F. using 675 milliliters (460 p.s.i.g.) of liquid propylene and 3.5 p.s.i.g. of hydrogen pressure. Aluminum reduced and activated $TiCl_3$ was used with $Et_2AlCl$.

Solubles was determined by taking a 20 gram portion of the polypropylene product and washing it at room temperature with 200 milliliters of hexane containing 2 milliliters of methanol. The remaining polypropylene product was dried at 75°C. for 3 hours. The filtrate was evaporated to dryness. Solubles is then 100 times the residue from evaporation divided by 20.

The results are shown in the Table below.

TABLE V

| $Et_2AlCl/TiCl_3/BTS/TBP$ (Molar Ratios) | Crystalline Rate (grams per gram $TiCl_3$) per hour) | Solubles (percent) |
|---|---|---|
| 5.6 / 1 /0.12/0.225 | 1956.8 | 1.80 |

The results below were obtained using another variety of aluminum reduced and activated $TiCl_3$.

| 5.6 / 1 /0.12/0.225 | 2106.2 | 1.70 |
|---|---|---|
| 3.0 / 1 /0.04/0.075 | 2088.5 | 2.12 |

EXAMPLE III

All polymerizations were carried out in a 2 liter reactor using about 18.2 p.s.i.g. hydrogen and 1,300 cubic centimeters of liquid propylene in 2 hour runs at 160°F. A 13 milliliter amount of n-hexane was added to the reactor with the catalyst. Aluminum reduced and activated $TiCl_3$ was used in 0.1 gram amount and the $Et_2AlCl/TiCl_3$ mol ratio is 4/1.0 for each run.

Solubles was determined by taking a 20 gram portion of polymer product, treating it with 250 milliliters of n-hexane at 160°F. for 2 hours, washing the residue with 100 milliliters of n-hexane, combining the wash and extract liquids and removing the hexane at ambient temperature in a vacuum oven. The extracted product was then dried at 160°F. for 2 hours. Solubles is 100 times the residue remaining after evaporation of the wash and extract liquids divided by 20.

| Et₃AlCl/TiCl₃BTS/TBP (Molar Ratios) | Crystalline Rate (grams per gram TiCl₃ per hour) | Solubles (percent) |
|---|---|---|
| 4/1/0.04/0.056 | 929 | 3.8 |
| 4/1/0.04/0.17 | 1154 | 3.4 |
| 4/1/0.04/0.34* | 909 | 2.9 |
| 4/1/0.04/0.34** | 747 | 4.3 |
| 4/1/0.04/0.51* | 1047 | 2.4 |
| 4/1/0.04/0.68* | 944 | 2.6 |
| 3/1/0.04/0.056 | 1055 | 3.4 |
| 3/1/0.04/0.17 | 1070 | 4.2 |
| 3/1/0.04/0.34 | 1075 | 5.5 |
| 4/1/0.06/0.17 | 1124 | 4.2 |
| 4/1/0.06/0.34 | 1057 | 4.1 |
| 4/1/0.06/0.56 | 1180 | 4.2 |
| 6/1/0.04/0.034 | 1139 | 3.4 |

*4 hour polymerization
**6 hour polymerization

What is claimed is:
1. A composition which comprises:
   a. a material selected from the group consisting of a trialkyl aluminum, a mixture of trialkyl aluminum and an alkylaluminum dichloride or dibromide, a mixture of a trialkyl aluminum and a dialkylaluminum chloride or bromide, and a dialkylalumimum chloride or bromide,
   b. titanium trichloride,
   c. an alkyltin sulfide, and
   d. a trihydrocarbylphosphite.
2. A composition which comprises:
   a. a material selected from the group consisting of a trialkyl aluminum, a mixture of a trialkyl aluminum and an alkylaluminum dichloride, a mixture of a trialkyl aluminum and a dialkylaluminum chloride, and a dialkyl-aluminum chloride,
   b. titanium trichloride,
   c. an alkyltin sulfide, and
   d. a trihydrocarbylphosphite.
3. A composition which comprises:
   a. a dialkylaluminum chloride, and
   b. titanium trichloride, and
   c. an alkyltin sulfide, and
   d. a trihydrocarbylphosphite.
4. The composition of claim 1 wherein (c) is bis-(trialkyl)tin sulfide and (d) is a trialkylphosphite.
5. The composition of claim 2 wherein (c) is bis-(trialkyl)tin sulfide and (d) is a trialkylphosphite.
6. The composition of claim 3 wherein (c) is bis-(trialkyl)tin sulfide and (d) is a trialkylphosphite.
7. The composition of claim 6 wherein (c) is bis-(tributyl)tin sulfide and (d) is tributylphosphite.
8. A process wherein propylene or propylene and at least 1 other alpha-olefin of from 2 to about 8 carbon atoms is contacted by at least a catalytic amount of a composition to form highly-crystalline polypropylene or copolymer wherein the polypropylene is still substantially crystalline comprising:
   a. a compound selected from the group consisting of a trialkyl aluminum, a mixture of a trialkyl aluminum and an alkylaluminum dichloride or dibromide, a mixture of a trialkyl aluminum and a dialkylaluminum chloride or bromide, and a dialkylaluminum chloride or bromide,
   b. titanium trichloride,
   c. an alkyltin sulfide, and
   d. a trihydrocarbylphosphite.
9. A process wherein propylene or propylene and at least 1 alpha-olefin of from 2 to about 8 carbon atoms is contacted by at least a catalytic amount of a composition to form highly-crystalline polypropylene or copolymer wherein the polypropylene is still substantially crystalline comprising:
   a. a compound selected from the group consisting of a trialkyl aluminum, a mixture of a trialkyl aluminum and an alkylaluminum dichloride, a mixture of trialkyl aluminum and a dialkyl-aluminum chloride and a dialkylaluminum chloride,
   b. titanium trichloride,
   c. an alkyltin sulfide, and
   d. a trihydrocarbylphosphite.
10. A process wherein propylene or propylene and at least 1 alpha-olefin of from 2 to about 8 carbon atoms is contacted by at least a catalytic amount of a composition to form highly-crystalline polypropylene or copolymer wherein the polypropylene is still substantially crystalline comprising:
    a. a dialkylaluminum chloride,
    b. titanium trichloride,
    c. an alkyltin sulfide, and
    d. a trihydrocarbylphosphite.
11. The process of claim 8 wherein (c) is a bis-(trialkyl)tin sulfide and (d) is a trialkylphosphite.
12. The process of claim 9 wherein (c) is a bis-(trialkyl)tin sulfide and (d) is a trialkylphosphite.
13. The process of claim 10 wherein (c) is bis-(trialkyl)tin sulfide and (d) is a trialkylphosphite.
14. The process of claim 13 wherein (c) is bis-(tributyl)tin sulfide and (d) is tributylphosphite.

* * * * *

UNITED STATES PATENT OFFICE
CERTIFICATE OF CORRECTION

PATENT NO. : 3,926,928
DATED : December 16, 1975
INVENTOR(S) : Nicholas M. Karayannis, Habet M. Khelghatian and Sam S. Lee It is certified that error appears in the above-identified patent and that said Letters Patent are hereby corrected as shown below:

Column 3, Line 52 – percentage should be percentages
Column 5, Line 70 – 3.0/110.04/0.075 should be 3.0/1/0.04/0.075
Column 7, Line 6 – $Et_2AlCl/TiCl_3BTS/TBP$ should be $Et_2AlCl/TiCl_3/BTS/TBP$ On the Title Page: "Missak Khelghatian" should read "Habet Missak Khelghatian"

Signed and Sealed this ninth Day of March 1976

[SEAL]

Attest:

RUTH C. MASON
Attesting Officer

C. MARSHALL DANN
Commissioner of Patents and Trademarks